(12) United States Patent
Nagao et al.

(10) Patent No.: US 6,495,062 B2
(45) Date of Patent: Dec. 17, 2002

(54) LUBRICATING OIL COMPOSITION FOR REFRIGERATORS AND METHOD FOR LUBRICATION WITH THE COMPOSITION

(75) Inventors: Satoshi Nagao, Sodegaura (JP); Toyokazu Handa, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 8 days.

(21) Appl. No.: 09/842,870

(22) Filed: Apr. 27, 2001

(65) Prior Publication Data

US 2001/0020695 A1 Sep. 13, 2001

Related U.S. Application Data

(63) Continuation of application No. 09/308,635, filed as application No. PCT/JP97/04173 on Nov. 17, 1997, now Pat. No. 6,248,256.

(30) Foreign Application Priority Data

Nov. 27, 1996 (JP) ............................................. 8-316094
Nov. 27, 1996 (JP) ............................................. 8-316095

(51) Int. Cl.[7] .................................................. C09K 5/04
(52) U.S. Cl. ........................................... 252/68; 252/67
(58) Field of Search ..................................... 252/68, 67

(56) References Cited

U.S. PATENT DOCUMENTS

| | | | |
|---|---|---|---|
| 3,642,634 A | * | 2/1972 | Olund |
| 4,046,533 A | * | 9/1977 | Olund |
| 4,199,461 A | * | 4/1980 | Olund |
| 6,261,474 B1 | | 7/2001 | Egawa et al. |

* cited by examiner

*Primary Examiner*—Margaret Einsmann
(74) *Attorney, Agent, or Firm*—Oblon, Spivak, McClelland, Maier & Neustadt, P.C.

(57) ABSTRACT

A composition for use in compression refrigeration comprising (A) a refrigerant containing a C1–C8 hydrocarbon as the principal ingredient, and (B) a lubrication base oil primarily formed of a hydrocarbon compound whose non-aromatic-group unsaturation degree is not more than 10% and whose kinematic viscosity is not less than 5 mm$^2$/s or (C) a lubrication base oil whose primary component is a specified polyalkylene glycol derivative having a kinematic viscosity of 5–200 mm$^2$/s at 100° C.; and a method for lubricating compression refrigerators making use of the composition. The composition and the method of the invention achieve improved antiabrasion and stable operation due to efficient lubrication, and as a result, enhanced lubrication performance and sealing effect, as well as improved refrigeration performance can be attained.

3 Claims, 1 Drawing Sheet

Figure 1:
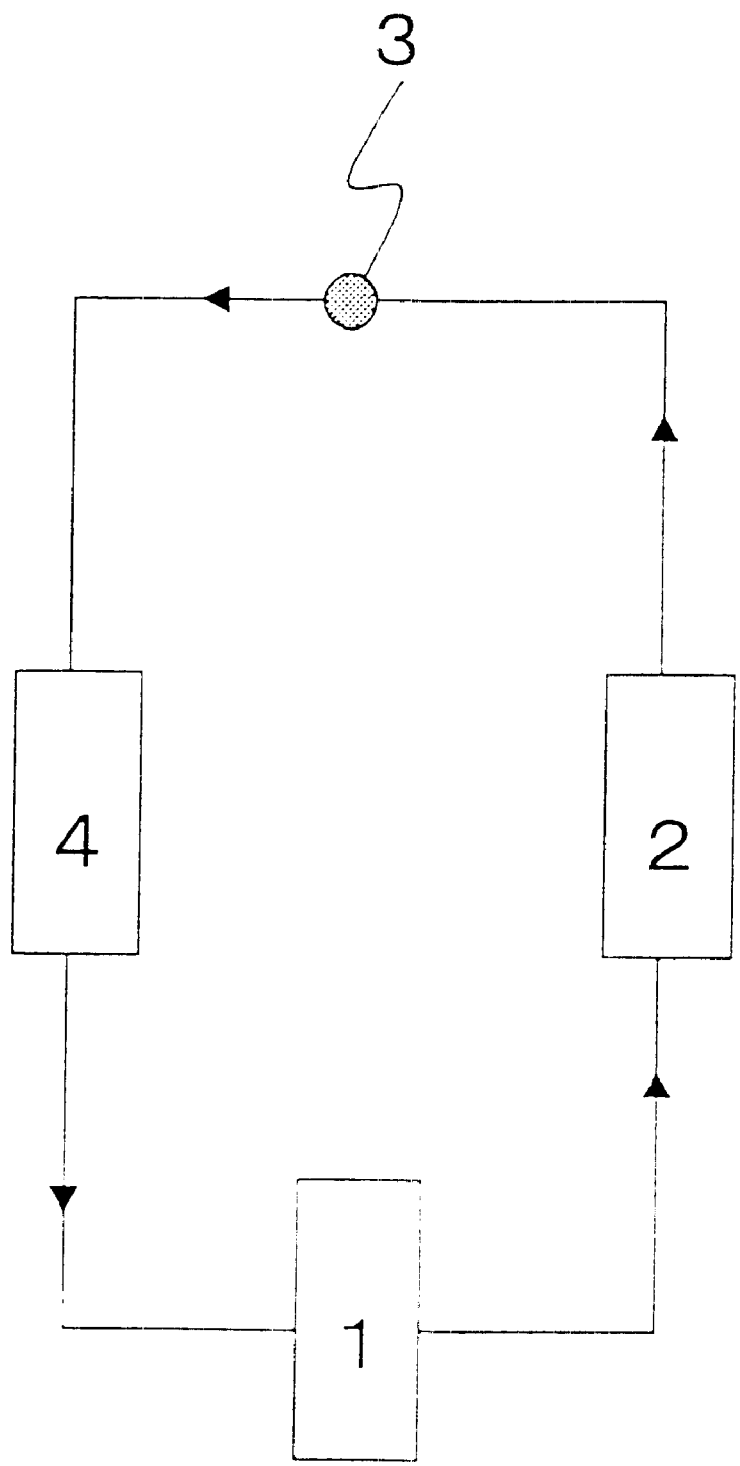

LUBRICATING OIL COMPOSITION FOR REFRIGERATORS AND METHOD FOR LUBRICATION WITH THE COMPOSITION

This application is a continuation of application Ser. No. 09/308,635 filed on Jun. 21, 1999, now U.S. Pat. No. 6,248,256, which was filed as International Application No. PCT/JP97/04173, filed on Nov. 17, 1997.

BACKGROUND OF THE INVENTION

1. Field of the Invention

The present invention relates to a composition for use in compression refrigeration and to a lubrication method using the composition. More particularly, the present invention relates to a composition for use in compression refrigeration making use of a refrigerant containing a C1–C8 hydrocarbon, and to a lubrication method using the composition.

2. Description of the Related Art

A refrigeration cycle of a refrigerator such as a compression-type refrigerator including a compressor, a condenser, an expansion valve, and an evaporator is generally designed such that a liquid mixture of a refrigerant an a lubrication case oil circulates in the closed system. In such a compression-type refrigerator, dichlorodifluoromethane (R-12) and chlorodifluoromethane (R-22) have conventionally been employed as a refrigerant in many cases, and a variety of mineral oils and synthetic oils have also been used as a lubrication base oil. However, chlorofluorocarbons such as R-12 and R-22 involve the risk of inviting environmental pollution such as destruction of the ozone layer existing in the stratosphere. Therefore, use of chlorocarbons has come to be more strictly restricted throughout the world. As substitutes therefore, hydrogen-containing fluoro-compounds such as hydrofluorocarbons and hydrochlorofluorocarbons have recently become of interest. Although the hydrogen-containing fluoro-compounds, particularly hydrofluorocarbons led by 1,1,1,2-tetrafluoroethane (R-134a), will not destroy the ozone layer, their long lives in the atmosphere invite some concern about possible contribution to the greenhouse effect. Therefore, a variety of hydrocarbons, inter alia, C1–C8 hydrocarbons, have now come to be studied, as they are free from such problems.

However, when a lubrication base oil prepared from a mineral oil or alkylbenzene—which are conventionally used quite commonly—is used in a compression-type refrigerator in which hydrocarbons are used as a refrigerant, the refrigerant completely dissolves in the lubrication base oil to reduce the viscosity of the lubrication base oil. As a result, lubrication performance becomes insufficient to reduce anti-wear effects, or sealing materials incorporated in the circulation system for the refrigerant degrade to make the sealing effect poor, which may prevent consistent use of the refrigerator over a prolonged period. Particularly in the case in which a capillary tube serves as an expansion valve, there is a strong tendency of sealing effect becoming poor.

SUMMARY OF THE INVENTION

The present invention was made in consideration of the above situation, and an object of the present invention is to provide a composition for use in compression refrigeration, which composition exhibits excellent characteristics as a lube oil for compression-type refrigerators, or refrigerating cycles, which incorporate a refrigerant containing a hydrocarbon as the principal ingredient, thus ensuring a prolonged life of the apparatus while reducing wear thereof, and which composition further improves refrigeration efficiency. Another object of the present invention is to provide a lubrication method making use of the composition.

The present inventors carried out extensive studies, and found that when a hydrocarbon compound having predetermined properties or a predetermined formula is used as a lubrication base oil, the aforementioned objects of the present invention can be effectively attained, leading to completion of the invention.

Accordingly, in a first aspect of the present invention, or as first invention, there is provided a composition for use in compression refrigeration comprising (A) a refrigerant containing a C1–C8 hydrocarbon as the principal ingredient, and (B) a lubrication base oil primarily formed of a hydrocarbon compound whose non-aromatic-group unsaturation degree is not more than 10% and whose kinematic viscosity is not less than 5 mm$^2$/s.

In a second aspect of the present invention, or as a second invention, there is provided a composition for use in compression refrigeration comprising (A) a refrigerant containing a C1–C8 hydrocarbon as the principal ingredient, and (C) a lubrication base oil whose primary component is a polyalkylene glycol derivative represented by the following formula (I):

$$R^1O\text{-}(PO)_a\text{-}(EO)_b\text{-}R^2 \qquad (I)$$

wherein each of $R^1$ and $R^2$, which may be identical to or different from each other, represents a hydrogen atom, a C1–C10 alkyl group, or a C2–C10 acyl group; PO represents an oxypropylene group, EO represents an oxyethylene group, and a and b are numbers not less than 0 which satisfy the relation $2 \leq a+b \leq 80$; wherein 1) in the case in which $R^1$ and $R^2$ are both hydrogen atoms, $$1 \leq 10X \leq 8 \qquad (II)$$

wherein X represents a mole fraction of PO in the molecule, and is equal to $a/(a+b)$ 2) in the case in which only one of $R^1$ and $R^2$ is a hydrogen atom, $$1 \leq 10X+Y/4 \leq 9 \qquad (III)$$

wherein X has the same meaning as defined above, and Y represents a sum of the carbon numbers of $R^1$ and $R^2$; and 3) in the case in which neither $R^1$ nor $R^2$ is a hydrogen atom, $$3 \leq 10X+Y \leq 10 \qquad (IV)$$

wherein X and Y have the same meanings as defined above; the lubrication base oil having a kinematic viscosity of 5–200 mm$^2$/s at 100° C.

In a third aspect of the present invention, or as a third invention, there is provided a method for lubricating compression refrigerators making use of a composition falling within the scope of either one of the above-described aspects.

BRIEF DESCRIPTION OF THE SOLE DRAWING

FIG. 1 is a diagram showing a compression refrigeration cycle including a compressor 1, condenser 2, expansion valve 3, and an evaporator 4.

MODES FOR CARRYING OUT THE INVENTION

Next will be described the modes for carrying out the present invention.

The composition for use in compression refrigerators according to the first invention comprises:

(A) a refrigerant containing a C1–C8 hydrocarbon as the principal ingredient, and (B) a lubrication base oil primarily formed of a hydrocarbon compound whose non-aromatic-group unsaturation degree as not more than 10% and whose kinematic viscosity is not less than 5 mm$^2$/s.

The carbon number of the hydrocarbon, the principal component of refrigerant (A), is from 1 to 8, preferably from 1 to 5, more preferably from 3 to 5. Hydrocarbons having 9 or more carbon atoms have an excessively high boiling point and reduce performance of the refrigerant. Examples of the hydrocarbons of the present invention include, but are not limited to, methane, ethane, ethylene, propane, cyclopropane, propylene, n-butane, i-butane, n-pentane, and i-pentane. These may be used singly or in combinations of two or more species. The refrigerant of the present invention contains the above-described hydrocarbon as the principal ingredient. Generally, 70% by weight or more, preferably 90% by weight or more of the refrigerant accounts the aforementioned hydrocarbon(s). Accordingly, in the present invention, there may be incorporated, in the form of a mixture, the aforementioned hydrocarbon(s) in an amount equal to or more than 70% by weight, preferably equal to or more than 90% by weight and other conventionally known refrigerants such as R-134 or other known hydrofluorocarbons, ether, or $CO_2$ in an amount equal to or less than 30% by weight, preferably equal to or less than 10% by weight. When the amount of "other refrigerants" is in excess of 30% by weight, contribution to the global greenhouse effect may not be reduced.

The non-aromatic-group unsaturation degree of the hydrocarbon compound serving as the primary ingredient of lubrication base oil (B) of the present invention represents the ratio of carbon-to-carbon unsaturated linkage which is not attributable to aromatic moieties with respect to the entirety of the carbon-to-carbon linkage within the hydrocarbon molecule, and is calculated from the following equation:

Non-aromatic-group unsaturation degree (%)={(The amount of unsaturated linkage which is not attributable to the aromatic group of the molecule)/(The entire amount of the carbon-to-carbon linkage within the molecule)}×100 wherein the each value used in the equation can be obtained from measurement by NMR(Nuclear Magnetic Resonance) method.

In the present invention, the above-defined unsaturation degree is not more than 10%, preferably not more than 5%, more preferably not more than 1%, and most preferably not more than 0.1%. The degree in excess of 10% may result in generation of sludge and clogging of capillary tubes.

The kinematic viscosity of the lubrication oil (B) of the present invention is not less than 5 mm$^2$/s, preferably 10 mm$^2$/s, and more preferably 20–500 mm$^2$/s. If the kinematic viscosity is less than 5 mm$^2$/s, the sealing effect of the refrigerator nay be reduced, or lubrication performance may become poor.

Although a variety of lubrication oils may be used in the present invention, it is preferable to use certain highly refined mineral oils, alkylbenzenes, alkylnaphthalenes, or poly-α-olefins which have the aforementioned non-aromatic-group unsaturation degree and kinematic viscosity respectively in the predetermined ranges.

Examples of the highly refined mineral oils include, but are not limited to, refined oils obtained by subjecting to a conventional refining procedure a distillate obtained through topping of paraffin base crude oil, intermediate base crude oil, or naphthene base crude oil, or through distillation of the topped crude under reduced pressure; extensive-dewaxed oli or deep-dewaxed oil which has been obtained by further extensively or deeply dewaxing of an refined oil; and hydro-refined oil obtained through hydrogenation. Refining methods include (a) hydrogenation, (b) dewaxing (solvent dewaxing and hydro-dewaxing), (c) solvent extraction, (d) distillation with an alkali or sulfuric acid treatment, or (e) clay treatment. These refining methods may be used singly or in suitable combinations. Any treatment may be divided into a plurality of steps and the steps may be performed repeatedly. More specifically, the following methods may be used: 1) hydrogenation of a distillate, 2) distillation with an alkali or sulfuric acid treatment following hydrogenation of a distillate, 3) dewaxing treatment following hydrogenation of a distillate, 4) hydrogenation following solvent extraction of a distillate, 5) two- or three-step hydrogenation of a distillate, which may be followed by distillation with an alkali or sulfuric acid treatment; and 6) additional dewaxing following any treatment 1), 2), 3), 4), or 5). Dewaxing treatment includes solvent dewaxing under severe conditions and catalytic dewaxing by use of a zeolite catalyst. Among highly refined mineral oils, extensively dewaxed oil is advantageously used in the present invention in view of its excellent low temperature fluidity and absence of wax precipitation at low temperature.

The highly refined oils may be used singly or in combination of two or more species. When two or more species are mixed, the kinematic viscosity of each oil preferably falls within the above-described predetermined range. Nonetheless, so long as the kinematic viscosity of the resultant mixture or highly refined oils falls within the above-described predetermined range, such a mixture can also be used.

As regards the alkylbenzenes, although any species of alkylbenzenes, which have conventionally been incorporated into lube oils for refrigerators may be used, those having a viscosity higher than that of conventionally employed ones are advantageously used in the present invention.

Examples of such highly viscous alkylbenzenes include those such as monoalkylbenzenes, dialkylbenzenes, and trialkylbenzenes in which one or more alkyl groups have been substituted and the total carbon numbers of all alkyl groups substituted to the benzene ring is 20 or more. In consideration of thermal stability, particularly preferred are alkylbenzenes having 2 or more alkyl groups—particularly dialkylbenzenes—in which the total carbon number of all the alkyl groups substituted to the benzene ring is 20 or more.

The alkylbenzenes may be used singly or in combination of two or more species. When two or more species are mixed, the kinematic viscosity of each alkylbenzene preferably falls within the above-described predetermined range. Nonetheless, so long as the kinematic viscosity of the resultant mixture of alkylbenzenes falls within the above-described predetermined range, such a mixture can also be used.

The alkylnaphthalenes, which are used in the present invention, preferably have 2 or 3 alkyl groups substituted on the naphthalene ring. Particularly, those having alkyl groups whose total carbon atoms are 20 or more are preferably used from the viewpoint of thermal stability.

The alkylnaphthalenes may be used singly or in combination of two or more species. When two or more species are mixed, the kinematic viscosity of each alkylnaphthalene preferably falls within the above-described predetermined range. Nonetheless, so long as the kinematic viscosity of the resultant mixture of alkylnaphthalene falls within the above-described predetermined range, such a mixture can also be used.

The poly-α-olefins are preferably C8–C18 α-olefin polymers—specifically polymers of 1-dodecene, 1-decene, or of 1-octene—from the viewpoint of thermal stability, sealing effect of refrigerators, lubricating performance, etc. In the present invention, hydrogenated poly-α-olefins are preferred in view of their excellent thermal stability.

The poly-α-olefins may be used singly or in combination of two or more species. When two or more species are mixed, the kinematic viscosity of each alkylnaphthalene preferably falls within the above-described predetermined range. Nonetheless, so long as the kinematic viscosity of the resultant mixture of poly-α-olefins falls within the above-described predetermined range, such a mixture can also be used.

As the lubrication base oil of the present invention there may be used a single species or a mixture of species of the aforementioned highly refined mineral oils, alkylbenzenes, alkylnephthalenes, and poly-α-olefins. When two or more species are mixed, the kinematic viscosity of each component preferably falls within the above-described predetermined range. Nonetheless, so long the kinematic viscosity of the resultant lubrication oil mixture falls within the above-described predetermined range, such a mixture can also be used.

In the present invention, among the above-described lubrication oils, highly refined mineral oils are particularly preferred in view that the unsaturation degree can be controlled in accordance with the price and the level of refining.

In the first aspect of the present invention, the ratio of refrigerant (A) to lubrication base oil (B), i.e., (A)/(B), is preferably 99/1–10/90, more preferably 95/5–30/70. If component (A) is contained in an amount which falls outside the lower limit, refrigeration power may become poor, whereas if it falls outside the upper limit, lubrication performance of the resultant composition may not be satisfactory.

In the second aspect of the present invention, the composition for use in compression refrigeration comprises:

(A) a refrigerant containing a C1–C8 hydrocarbon as the principal ingredient, and (C) a lubrication base oil whose primary component is a polyalkylene glycol derivative and which has a kinematic viscosity not less than 5 mm²/s at 100° C.

Component (A) of the present invention, i.e., a refrigerant, has already been described hereinabove in relation to the first aspect of the invention. In the present invention, the lubrication base oil, or component (C), comprises a polyalkylene glycol derivative represented by the following formula (I):

$$R^1O\text{-}(PO)_a\text{-}(EO)_b\text{-}R^2 \quad (I)$$

wherein each of $R^1$ and $R^2$, which may be identical to or different from each other, represents a hydrogen atom, a C1–C10 alkyl group, or a C2–C10 acyl group; PO represents an oxypropylene group, EO represents an oxyethylene group, and a and b are numbers not less than 0 and satisfy the relation $2 \leq a+b \leq 80$; wherein 1) in the case in which $R^1$ and $R^2$ are both hydrogen atoms, $$1 \leq 10X \leq 8 \quad (II)$$

wherein X represents a mole fraction of PO in the molecule and is equal to a/(a+b);

2) in the case in which only one of $R^1$ and $R^2$ is a hydrogen atom, $$1 \leq 10X+Y/4 \leq 9 \quad (III)$$

wherein X has the same meaning as defined above, and Y represents a sum of the carbon numbers of $R^1$ and $R^2$; and 3) in the case in which neither $R^1$ nor $R^2$ is a hydrogen atom, $$3 \leq 10X+Y \leq 10 \quad (IV)$$

wherein X and Y have the same meanings as defined above.

In formula (I), each of the alkyl groups represented by $R^1$ and $R^2$ has 1 to 10, preferably 1 to 6, carbon atoms. If the alkyl group has 11 or more carbon atoms, compatibility between the lubrication oil and the hydrocarbon serving as a refrigerant becomes considerably high, to thereby permit the hydrocarbon to freely dissolve at an arbitrary ratio. The alkyl group may be linear, branched, or cyclic. Specific examples of the alkyl group include methyl, ethyl, n-propyl, isopropyl, a variety of butyl groups, a variety of pentyl groups, a variety of hexyl groups, a variety of heptyl groups, a variety of octyl groups, a variety of nonyl groups, a variety of decyl groups, cyclopentyl group, and cyclohexyl group.

Each of the acyl groups represented by $R^1$ and $R^2$ has 2 to 10, preferably 2 to 6, carbon atoms. If the acyl group has 11 or more carbon atoms, compatibility between the lubrication oil and the hydrocarbon (which serves as a refrigerant) becomes considerably high, to thereby permit the hydrocarbon to freely dissolve at an arbitrary ratio. The alkyl moiety of the acyl group may be linear, branched, or cyclic. Specific examples of the alkyl moiety of the acyl group include diversified C1–C9 alkyl groups, which are described hereinabove as examples of alkyl groups.

The recurring units in formula (I), i.e. PO and EO, may be of a block type or a random type.

The lubrication base oil of the present invention must satisfy one of aforementioned expression (II), (III), or (IV). If relations $10X \leq 8$ in expression (II), $10X+Y/4 \leq 9$ in expression (III), and $10X+Y \leq 10$ in expression (IV) are not satisfied, the lubrication base oil dissolves in the refrigerant hydrocarbon completely, which is not preferable. On the other hand, if relations $1 \leq 10X$ in expression (II), $1 \leq 10X+Y/4$ in expression (III), and $3 \leq 10X+Y$ in expression (IV) are not satisfied, compatibility between the lubrication base oil and the hydrocarbon serving as a refrigerant decreases, to thereby cause a phase separation. In consideration of compatibility between the lubrication base oil and the refrigerant hydrocarbon, the lubrication base oil preferably satisfies one of the following relations (II)', (III)', or (IV)'.

1) in the case in which $R^1$ and $R^2$ are both hydrogen atoms, $$4 \leq 10X \leq 7 \quad (II)'$$

2) in the case in which only one of $R^1$ and $R^2$ is a hydrogen atom, $$4 \leq 10X + Y/4 \leq 8 \quad \text{(III)}'$$

3) in the case in which neither $R^1$ nor $R^2$ is a hydrogen atom, $$5 \leq 10X + Y \leq 9 \quad \text{(IV)}'$$

The lubrication base oil, component (C), of the present invention has a kinematic viscosity of 5–200 mm²/s, preferably 9–100 mm²/s, at 100° C. If the kinematic viscosity is less than 5 mm²/s, sealing characteristics of the refrigeration cycle portion of the refrigerator become poor, and in addition, lubrication performance is also unsatisfactory, whereas if it is in excess of 200 mm²/s, viscous resistance increases at low temperature, the torque increases, and the refrigerator may become difficult to start.

As the lubrication base oil of the present invention, the aforementioned polyalkylene glycol derivatives may be used singly or in combination.

In the second aspect of the present invention, the ratio of refrigerant (A) to lubrication base oil (C), i.e., (A)/(C), is preferably 99/1–10/90, more preferably 95/5–30/70. If component (A) is contained in an amount, which falls outside the lower limit, refrigeration power may become poor, whereas if it falls outside the upper limit, lubrication performance of the resultant composition may not be satisfactory.

The composition for use in compression refrigeration, which falls under the scope of the first or the second invention, optionally contains a variety of known additives. Such additives include extreme pressure agents such as phosphoric acid esters (e.g., tricresyl phosphate (TCP)) and phosphorous acid esters (e.g., tris(nonylphenyl)phosphite); phenol- or amine-base antioxidants; stabilizers such as phenyl glycidyl ether, cyclohexene oxide, and epoxylated soybean oil; copper deactivators such as benzotriazole and its derivatives; and defoamers such as silicone oils and fluorinated silicone oils. Moreover, load-carrying additives, chlorine scavengers, detergent-dispersants, viscosity index improvers, oiliness-imparting agents, rust-preventive agents, corrosion inhibitors, pour point depressants, etc. may also be incorporated as desired. These additives are incorporated in amounts of 0.5–10% by weight with respect to the total weight of the composition.

In the third aspect of the present invention, there is provided a lubrication method for compression refrigerators which makes use of the composition for use in compression refrigeration described hereinabove in association with the first or the second aspect of the invention.

The composition, which falls under the scope of the first or the second aspect of the present invention, can be used in diversified types of refrigerators. Particularly, the composition is suitably used with compression refrigeration cycles of compression refrigerators, and it is advantageously used for conventional compression refrigeration cycles including a compressor 1, a condenser 2, an expansion valve 3, and an evaporator 4, which is shown in FIG. 1.

EXAMPLES

The present invention will next be described in more detail by way of examples, which should not be construed as limiting the invention.

Examples 1 through 7 and Comparative Examples 1 and 2

(1) Compositions for use in compression refrigeration:

A refrigerant composed of a propane-isobutane mixture (1:1 in a molar ratio, 70% by weight) and each of the lubrication base oils (30% by weight) shown in Table 1 were mixed to prepare compositions for use in compression refrigeration of Examples 1 through 7 and Comparative Examples 1 and 2. By use of the thus-prepared compositions and an apparatus in actual use, the following test was performed. The results are shown in Table 1.

(2) Compress in refrigeration cycle:

The compression refrigeration cycle of the refrigerator used in the test included a compressor, a condenser, an expansion valve, and an evaporator. The expansion valve was or a capillary tube type.

(3) Test by use of apparatus in actual use:

Each of the compositions for use in compression refrigeration prepared as described above was incorporated into a refrigerator (output: 100W), and the test was continued for one year under the following conditions.

(operation conditions)

| | |
|---|---|
| Intake temperature: | 0° C. |
| Discharge temperature: | 100° C. |
| Temperature at the outlet of the condenser: | 10° C. |

(Evaluation method)

When malfunction occurred during operation, the operation was stopped, parts of the apparatus were visually checked, and the causes of malfunction were investigated.

TABLE 1

| | Lubrication Base oil | Kinematic viscosity (mm²/s) (100° C.) | Un-saturation degree (%) | Status |
|---|---|---|---|---|
| Ex. 1 | Mineral oil 1*¹ | 22 | 0.1> | In good order |
| Ex. 2 | Mineral oil 2*² | 10 | 0.1> | In good order |
| Ex. 3 | Mineral oil 3*³ | 5 | 0.1> | In good order |
| Ex. 4 | Mineral oil 4*⁴ | 25 | 7 | Small amount of sludge |
| Ex. 5 | Alkylbenzene*⁵ | 15 | 0.1> | In good order |
| Ex. 6 | Alkylnaphtalene*⁶ | 21 | 0.1> | In good order |
| Ex. 7 | Poly-α-olefin*⁷ | 20 | 0.1> | in good order |
| Comp. Ex. 1 | Mineral oil 5*⁸ | 3 | 0.1> | Seizure |
| Comp. Ex. 2 | Mineral oil 6*⁹ | 25 | 13 | Clogging of capillary tube |

*¹: A lubrication oil obtained through extensive dewaxing and hydrogenation of a paraffin-base mineral oil.
*²: A lubrication oil obtained through extensive dewaxing and hydrogenation of a paraffin-base mineral oil.
*³: A lubrication oil obtained through extensive dewaxing and hydrogenation of a paraffin-base mineral oil.

TABLE 1-continued

| Lubrication Base oil | Kinematic viscosity (mm²/s) (100° C.) | Un-saturation degree (%) | Status |
|---|---|---|---|

*⁴: A lubrication oil obtained through solvent treatment of a paraffin-base mineral oil.
*⁵: A lubrication oil obtained through hydrogenation and clay treatment of an alkylbenzene.
*⁶: A lubrication oil obtained through hydrogenation and clay treatment of an alkylnaphthalene.
*⁷: A lubrication oil obtained through hydrogenation of a 1-decene polymer.
*⁸: A lubrication oil obtained through extensive dewaxing and hydrogenation of a paraffin-base mineral oil.
*⁹: A lubrication oil obtained through solvent treatment of a naphthene-base mineral oil.

Examples 8 through 12 and Comparative Examples 3 through 5

The polyalkylene glycol derivatives (random copolymers of PO and EO) shown in Table 2 were prepared, and the amount of dissolved n-pentane was measured in accordance with the following method. The results are shown in Table 3.

<Amount of dissolved n-pentane (20° C.)>

A sample composition (20 g) was placed in a glass beaker. While the composition was stirred, n-pentane was added thereto. The point of time at which the liquid became cloudy was taken as an end point. The amount of dissolved n-pentane was computed from the following equation:

Amount of dissolved n-pentane (wt %)={n-pentane (g)}÷{oil composition (g)+n-pentane (g)}×100

TABLE 2

|  | $R^1$ | $R^2$ | A | B | Kinematic viscosity (mm²/s) (100° C.) |
|---|---|---|---|---|---|
| Ex. 8 | Hydrogen | Hydrogen | 10.0 | 10.0 | 11.0 |
| Ex. 9 | Hydrogen | Hydrogen | 16.0 | 7.0 | 13.3 |
| Ex. 10 | Methyl | Hydrogen | 14.0 | 6.0 | 11.0 |
| Ex. 11 | Methyl | Methyl | 18.0 | 8.0 | 16.2 |
| Ex. 12 | Methyl | Methyl | 22.0 | 22.0 | 30.5 |
| Comp. Ex. 3 | Hydrogen | Hydrogen | 17.0 | 0 | 10.5 |
| Comp. Ex. 4 | Hydrogen | Hydrogen | 20.0 | 0 | 12.6 |
| Comp. Ex. 5 | Methyl | Methyl | 26.0 | 0 | 15.3 |

TABLE 3

|  | X | Y | Expression | Value of expression | Amount of dissolved n-pentane |
|---|---|---|---|---|---|
| Ex. 8 | 0.50 | 0 | II | 5.0 | 20 |
| Ex. 9 | 0.70 | 0 | II | 7.0 | 40 |
| Ex. 10 | 0.70 | 1 | III | 7.25 | 65 |
| Ex. 11 | 0.69 | 2 | IV | 8.9 | 40 |
| Ex. 12 | 0.50 | 2 | IV | 7.0 | 35 |
| Comp. Ex. 3 | 1.00 | 0 | II | 10.0 | Completely dissolved |
| Comp. Ex. 4 | 1.00 | 1 | III | 10.25 | Completely dissolved |
| Comp. Ex. 5 | 1.00 | 2 | IV | 12.0 | Completely dissolved |

*: "Completely dissolved": almost freely and infinitely soluble

As described above, the composition of the present invention enables efficient lubrication of compression refrigeration cycles which incorporate a refrigerant containing C1–C8 hydrocarbon as a primary ingredient, and thus reduces abrasion occurrable in compression refrigerators and improves sealing characteristics. As a result, there can be provided a composition for use in compression refrigeration and a lubrication method makng use of the composition, which composition and method improve long-term operation stability and refrigeration efficiency.

What is claimed is:

1. A composition for use in compression refrigeration comprising (A) a refrigerant containing a C1–C8 hydrocarbon as the principal ingredient, and (B) a lubrication base oil primarily formed of a hydrocarbon compound, selected from the group consisting of alkylbenzenes and poly-α-olefins, whose non-aromatic-group unsaturation degree is not more than 10% and whose kinematic viscosity is not less than 5 mm²/s.

2. A method of using a composition, the method comprising lubricating a compression refrigerator with the composition of claim 1.

3. A method of making a composition, the method comprising mixing a refrigerant and a lubrication base oil; and forming the composition of claim 1.

* * * * *